(12) United States Patent
Kallenberg, Jr.

(10) Patent No.: US 6,323,563 B1
(45) Date of Patent: Nov. 27, 2001

(54) HYDRODYNAMIC POWER-GENERATING SYSTEM

(76) Inventor: Robert C. Kallenberg, Jr., P.O. Box 73522, Fairbanks, AK (US) 99707-3522

( * ) Notice: Subject to any disclaimer, the term of this patent is extended or adjusted under 35 U.S.C. 154(b) by 0 days.

(21) Appl. No.: 09/625,169

(22) Filed: Jul. 25, 2000

Related U.S. Application Data

(60) Provisional application No. 60/145,587, filed on Jul. 25, 1999.

(51) Int. Cl.$^7$ ............... F03B 13/10; F03B 13/22; H02P 9/04
(52) U.S. Cl. ............... 290/42; 290/43; 290/53; 290/54
(58) Field of Search ............... 290/42, 43, 53, 290/54; 416/83

(56) References Cited

U.S. PATENT DOCUMENTS

| | | | |
|---|---|---|---|
| 3,978,345 | * 8/1976 | Bailey | 290/54 |
| 4,347,036 | 8/1982 | Arnold . | |
| 4,525,122 | 6/1985 | Krnac . | |
| 4,590,386 | * 5/1986 | Wiggs | 290/54 |
| 4,595,336 | 6/1986 | Grose . | |
| 4,617,991 | * 10/1986 | Luetzelschwab | 166/53 |
| 4,880,353 | 11/1989 | Dettwiler . | |
| 5,009,571 | 4/1991 | Smith . | |
| 5,324,169 | 6/1994 | Brown et al. . | |
| 5,548,956 | * 8/1996 | Price | 60/369 |
| 5,899,664 | 5/1999 | Lawrence . | |

FOREIGN PATENT DOCUMENTS

9420751 * 9/1994 (RU) ............... 290/53

* cited by examiner

*Primary Examiner*—Elvin Enad
*Assistant Examiner*—Julio Cesar Gonzalez

(57) ABSTRACT

A hydrodynamic power-generating system includes a power plant, a motion-generating subsystem, and a support subsystem for supporting the motion-generating subsystem in a dynamic water source such as a river. The motion-generating subsystem is configured to oscillate and pivot under hydrodynamic force to drive a rod. The power plant is configured to then convert the oscillating drive motion of the rod to electrical power. The motion-generating subsystem includes a pair of spaced beams having upstream ends and downstream ends. The spaced beams are pivotally supported within the water at the upstream ends thereof by the support subsystem. A pair of shafts are connected to and between the beams at the upstream ends and the downstream ends, respectively. A foil is pivotally disposed between the downstream ends of the beams. A trim flap is pivotally disposed at a downstream edge of the foil. The trim flap may be actuated between a first position which causes the foil to pivot in one direction and a second position which causes the foil to pivot in an opposite direction. The pivoting of the foil causes the beams to pivot back and forth, thereby causing the rod, which is attached to at least one of the beams, to oscillate back and forth.

5 Claims, 6 Drawing Sheets

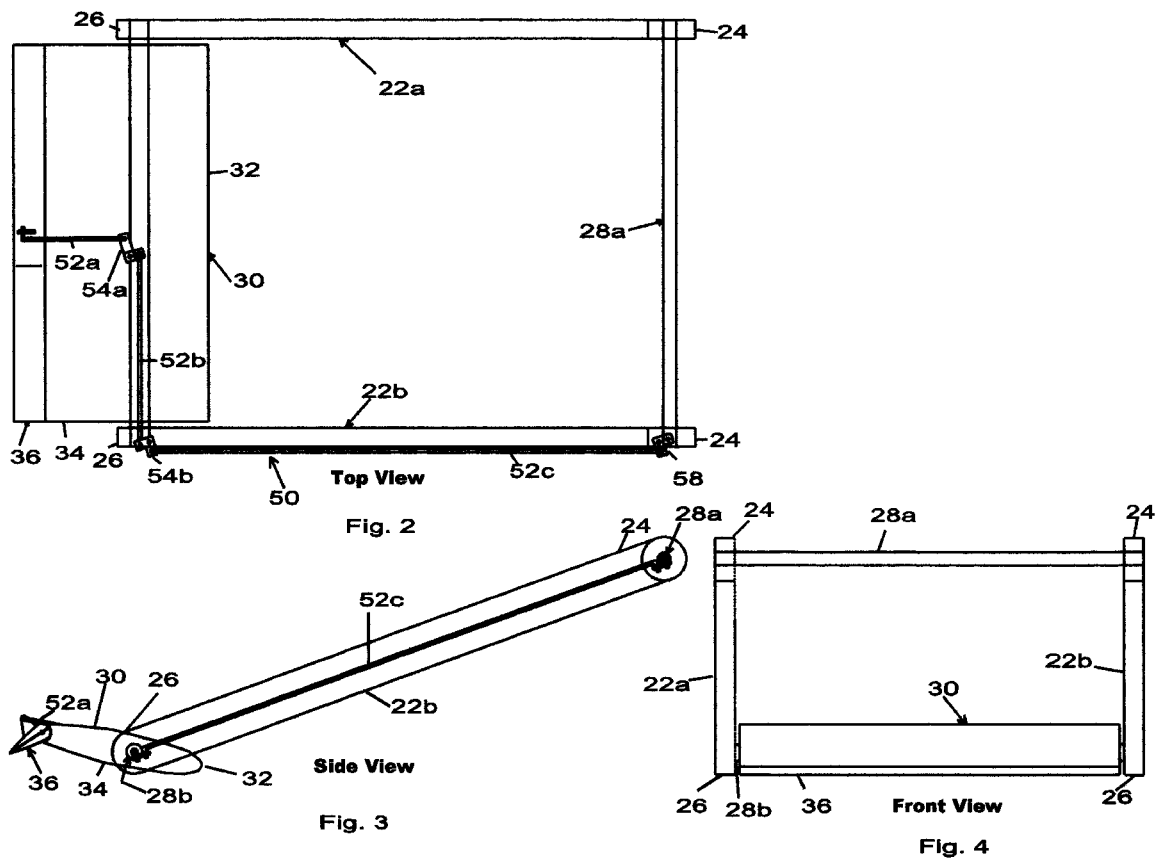

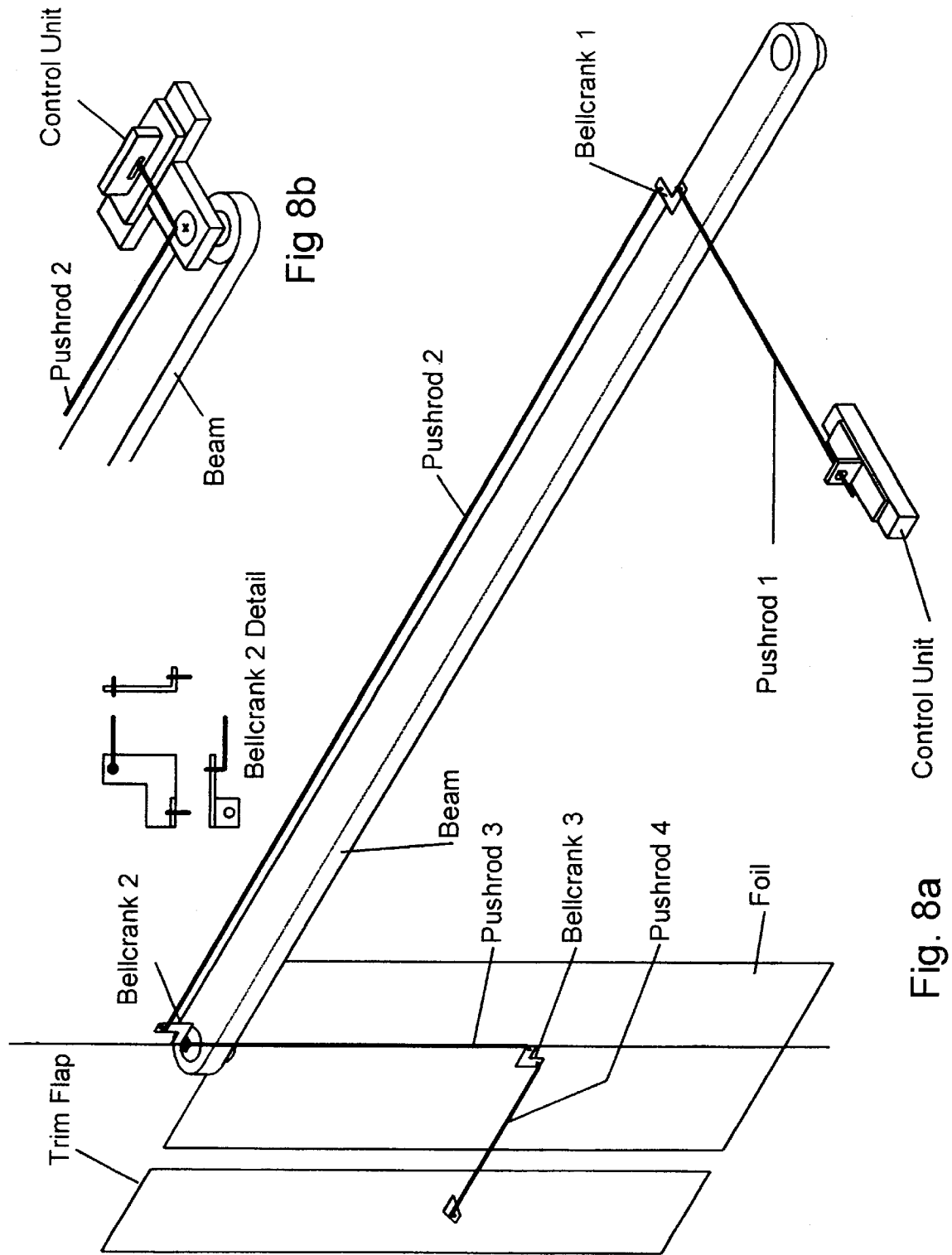

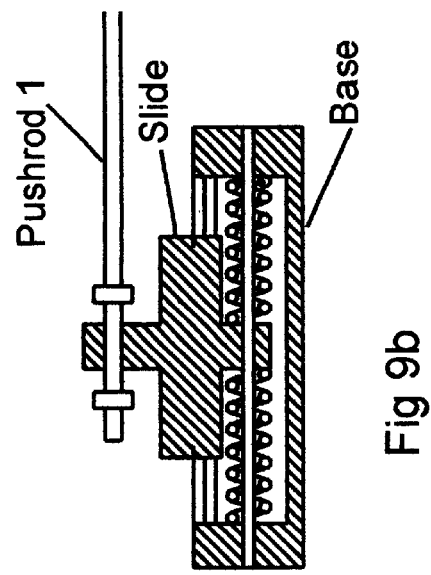
Fig 9b
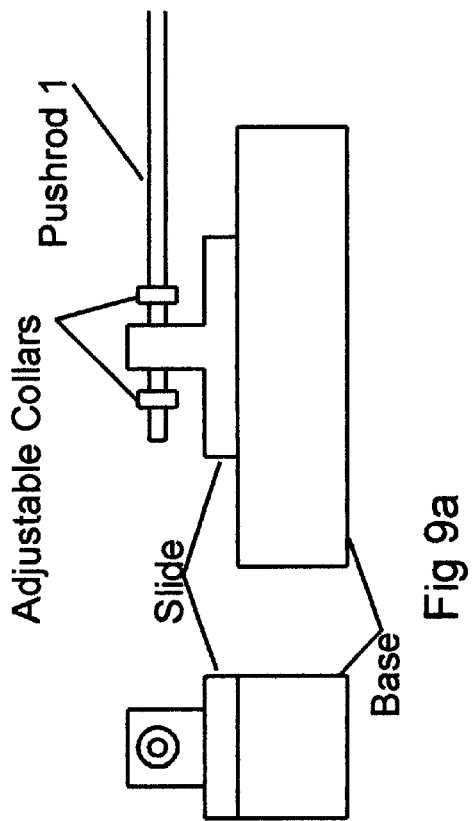
Fig 9a
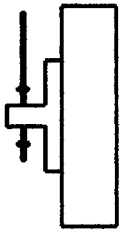
Fig. 9c
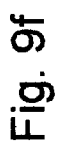
Fig. 9f
Fig. 9d
Fig. 9e
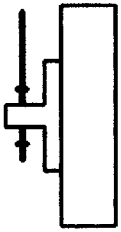
Fig. 9g
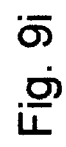
Fig. 9i
Fig. 9h

HYDRODYNAMIC POWER-GENERATING SYSTEM

CROSS-REFERENCE TO RELATED PATENTS

This application claims priority on U.S. Provisional Application Ser. No. 60/145,587 filed Jul. 25, 1999.

FIELD OF THE INVENTION

The present invention relates generally to power-generating devices and, more particularly, to hydrodynamic power-generating systems.

BACKGROUND OF THE INVENTION

Numerous mechanisms have been designed and built for converting the energy of moving fluid, such as air or water, to mechanical energy. Commonly known mechanisms for converting the energy of moving water to mechanical energy are water wheels, paddles and turbines. Generally speaking, mechanisms for converting the energy of a moving fluid to mechanical power have tended throughout their evolution to become both more complicated and more costly to manufacture. Modem axial flow turbine systems typically require the construction of dams or diversions and penstocks to support even low power production.

In view of the foregoing, there remains a need in the art for a low-cost in-stream system for utilizing the energy in a fluid stream as a pumping station or an electrical generator.

BRIEF SUMMARY OF THE INVENTION

In a preferred embodiment, the present invention provides a hydrodynamic power-generating system including a motion-generating subsystem disposed in a dynamic source of water such as a river. The motion-generating subsystem is retained in placed in the dynamic water source by a support subsystem and is connected to a power plant by a rod. The motion-generating subsystem is configured to oscillate and pivot under hydrodynamic force to drive the rod. The power plant is configured to then convert the oscillating drive motion of the rod to electrical power.

According to one aspect of the invention, the motion-generating subsystem includes a pair of spaced beams having upstream ends and downstream ends. The spaced beams are pivotally supported within the water at the upstream ends thereof by the support subsystem. A pair of shafts are connected to and between the beams at the upstream ends and the downstream ends, respectively. The motion-generating subsystem also includes a foil pivotally disposed between the downstream ends of the beams. The foil has an upstream edge and a downstream edge. A trim flap is pivotally disposed at the downstream edge of the foil. The trim flap may be actuated between a first position which causes the foil to pivot in one direction and a second position which causes the foil to pivot in an opposite direction. The pivoting of the foil causes the beams to pivot back and forth, thereby causing the rod, which is attached to at least one of the beams, to oscillate back and forth.

The motion-generating subsystem is able to be disposed in water sources such as rivers and estuaries where the dynamic motion of the water can be harnessed to generate electricity. With relatively few components, the motion-generating subsystem can also be fabricated relatively inexpensively and easily, thereby being readily available to those living in out-laying areas where conventionally generated power may not be readily available.

Other aspects, features, and advantages of the present invention will become apparent to those skilled in the art from a consideration of the following detailed description taken in conjunction with the accompanying drawings.

BRIEF DESCRIPTION OF THE SEVERAL VIEWS OF THE DRAWINGS

FIG. 2 is a top view of an exemplary hydrodynamic motion-generating subsystem of the present invention;

FIG. 3 is a side view of the motion-generating subsystem of FIG. 2;

FIG. 4 is a front view of the motion-generating subsystem of FIG. 2;

FIGS. 8A–8B show an operation of the trim flap control system

FIGS. 9a–9i show a description of the control unit.

DETAILED DESCRIPTION OF THE INVENTION

Figure 1:
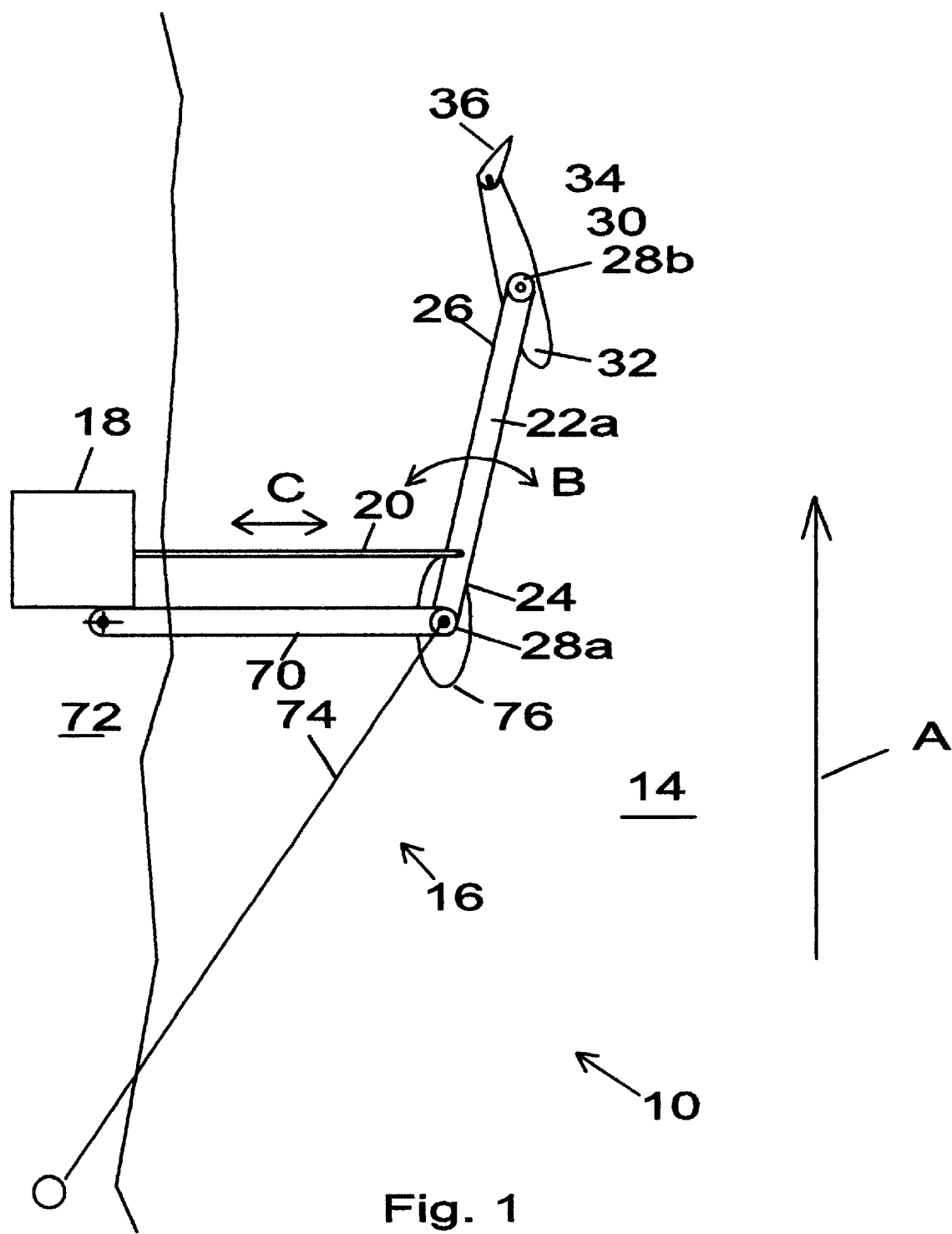
FIG. 1 is a schematic view of an exemplary hydrodynamic power-generating system in accordance with the present invention.

Referring more particularly to the drawings, an exemplary hydrodynamic power-generating system 10 of the present invention is illustrated in FIG. 1. Exemplary power-generating system 10 includes a motion-generating subsystem 12 disposed in a dynamic source of water 14 such as a river flowing in the direction of arrow A. The motion-generating subsystem 12 is retained in placed in the dynamic water source 14 by a support subsystem 16 and is connected to a power plant 18 by a rod 20. The motion-generating subsystem 12 is configured to oscillate and pivot as shown by arrow B under hydrodynamic force to drive the rod 20 as shown by arrow C. The power plant 18 is configured to then convert the oscillating drive motion of the rod 20 to electrical power.

With additional reference to FIGS. 2, 3, and 4, the hydrodynamic subsystem 12 includes a pair of spaced beams 22a and 22b having upstream ends 24 and downstream ends 26. The spaced beams 22 are pivotally supported within the water 14 at the upstream ends 24 thereof by the support subsystem 16. A pair of shafts 28a and 28b are connected to and between the beams 22 at the upstream ends 24 and the downstream ends 26, respectively.

The hydrodynamic subsystem 12 also includes a foil 30 pivotally disposed between the downstream ends 26 of the beams 22. The foil 30 has an upstream edge 32 and a downstream edge 34. A trim flap 36 is pivotally disposed at the downstream edge 34 of the foil 30. The trim flap 36 may be actuated between a first position which causes the foil 30 to pivot in one direction and a second position which causes the foil 30 to pivot in an opposite direction. The pivoting of the foil 30 causes the beams 22 to pivot back and forth as shown by arrow B, thereby causing the rod 20, which is attached to at least one of the beams, to oscillate back and forth as shown by arrow C.

Figure 5A:
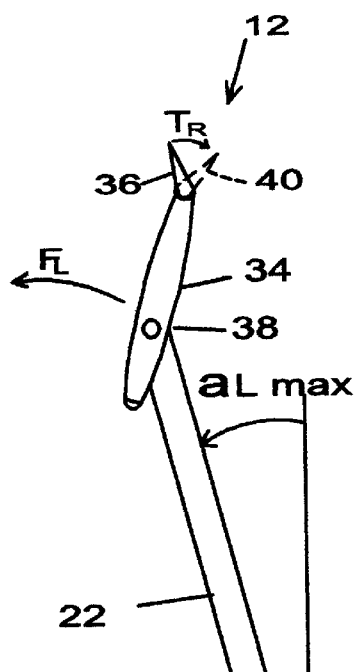
FIG. 5A is a view illustrating the motion-generating subsystem in most leftward position, with a trim flap in a most leftward position.
Figure 5B:
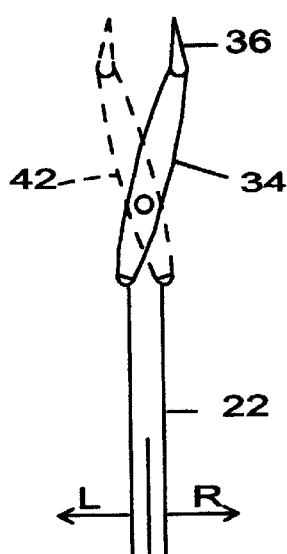
FIG. 5B is a view illustrating the motion-generating subsystem in an intermediate position.
Figure 5C:
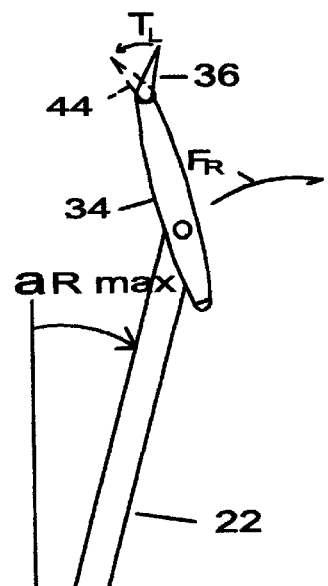
FIG. 5C is a view illustrating the motion-generating subsystem in a most rightward position, with the trim flap in a most rightward position.

More specifically, with reference to FIGS. 5A, 5B, and 5C, to cause the beams 22 to move leftward, the trim flap 36 is in a leftward position as shown in FIG. 5A. (For the purposes of this description, the terms leftward and rightward as used in connection with the drawings; however, the motion-generating subsystem 12 may be configured to oscillate up and down within a dynamic water source.) The leftward position of the trim flap 36 causes the foil 30 to be in a rightward position so that water flowing in the direction of arrow A flows against a right surface 38 of the foil 30, thereby exerting pressure on the right surface 38 and urging the beams 22 to pivot leftward as indicated by arrow L.

When the beams 22 have reached a most leftward position as indicated by angle $\alpha_{Lmax}$ from longitudinal axis X in FIG. 5A, the trim flap 36 is actuated to pivot rightward as indicated by arrow $T_R$. When the trim flap 36 is in a rightward position as indicated by the dashed line in FIG. 5A, water flows against a right surface 40 of the trim flap 36, thereby causing the foil 30 to pivot leftward as indicated by arrow $F_L$. Water then flows against a left surface 42 of the foil 30, thereby exerting pressure on the left surface 42 and urging the beams 22 to pivot rightward as indicated by arrow R.

When the beams 22 have reached a most rightward position as indicated by angle $\alpha_{Rmax}$ from longitudinal axis X in FIG. 5C, the trim flap 36 is actuated to pivot leftward as indicated by arrow $T_L$. When the trim flap 36 is in a leftward position as indicated by the dashed line in FIG. 5C, water flows against a left surface 44 of the trim flap 36, thereby causing the foil 30 to pivot rightward as indicated by arrow $F_R$. Water then flows against the right surface 38 of the foil 30, thereby urging the beams 22 to pivot leftward as indicated by arrow L. The trim flap 36 is configured to releasably retain the leftward and rightward positions with respect to the foil 30 and the foil 30 is configured to releasably retain the leftward and rightward positions with respect to the beams 22 in accordance with conventional apparatus.

Figure 6:
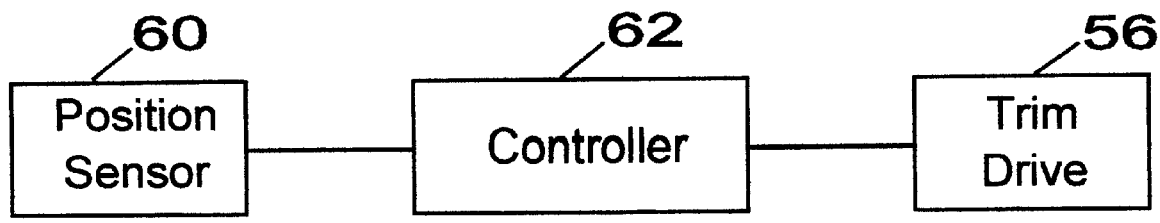
FIG. 6 is a block diagram illustrating the principles of a trim flap-control subsystem of the invention.

With continued reference to FIGS. 2 and 3 and with additional reference to FIG. 6, exemplary motion-generating subsystem 12 may include a trim flap-control system 50 with a plurality of bars 52a, 52b, 52c interconnected with pivotal L members 54a and 54b. The trim flap-control system 50 may also include trim drive 56 connected to a master L member 58 (or to bar 52c) for driving the bars 52 to translate and, accordingly, pivot the trim flap 36.

Figure 7:
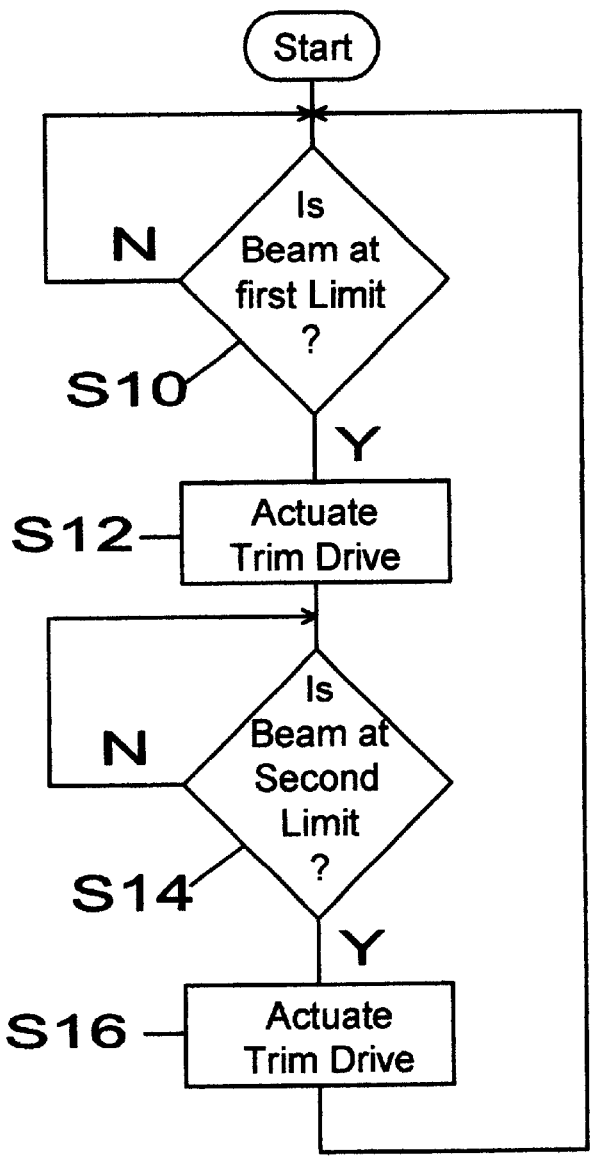
FIG. 7 is a flow diagram illustrating trim flap-control methodology of the invention.

To actuate the drive 56, the trim flap-control subsystem 50 may include a position sensor 60 and a controller 62. The position sensor 60 is configured to determine when the beams 22 are at the most leftward and most rightward positions. With additional reference to FIG. 7, if the beams 22 are at the most leftward position as indicated by angle $\alpha_{Lmax}$ in FIG. 5A (step S10) as sensed by the position sensor 60, the controller 62 actuates the trim drive 56 (step S12) to pivot the trim flap 36 rightward. Similarly, if the beams 22 are at the most rightward position as indicated by angle $\alpha_{Rmax}$ in FIG. 5C (step S14) as sensed by the position sensor 60, the controller 62 actuates the trim drive 56 (step S16) to pivot the trim flap 36 leftward. The process repeats continuously.

With further reference to FIG. 1, the support subsystem 16 may include a support beam 70 fixed at one end to a stationary location such as a river bank 72 and pivotally connected at the other end to a top one of the beams 22. The support subsystem 16 may also include a guy wire 74 fixed at an angle between the river back 72 and the top one of the beams 22. A float 76 may be provided at the connection of the support beam 70 and the guy wire 74 to suspend the motion-generating subsystem 12 within the dynamic water source 14, which may be suspended either vertically or horizontally within the water source 14.

The power plant 18 may be configured to extract energy from the oscillating motion of the rod 20 in accordance with conventional means. The power plant 18 may utilize mechanical, electrical, hydraulic, pneumatic, or a combination of these to produce usable energy.

Those skilled in the art will understand that the present invention is not limited to the embodiments specifically illustrated in the drawings and described above. Rather, the scope of the present invention is determined by the terms of the appended claims and their legal equivalents.

What is claimed is:

1. A power-generating system comprising:
   a support subsystem;
   a hydrodynamic subsystem connected to the power plant and configured to generate motion under hydrodynamic force, the subsystem including:
      a pair of spaced beams having upstream ends and downstream ends, the spaced beams being pivotally supported within a dynamic source of water at the upstream ends thereof by the support subsystem;
      a rod pivotally attached to at least one of the beams;
      a foil pivotally disposed between the downstream ends of the beams, the foil having an upstream edge and a downstream edge; and
      a trim flap pivotally disposed at the downstream edge of the foil;
      the trim flap being actuatable between a leftward position which causes the foil to pivot rightward and a rightward position which causes the foil to pivot leftward;
   the foil causing the beams to pivot leftward when positioned rightward and to pivot rightward when positioned leftward, thereby causing the rod oscillate back and forth; and the hydrodynamic subsystem is disposed substantially vertically or horizontally in the source of water;
   a power plant connected to the rod and configured to convert the back-and-forth motion of the rod into power.

2. A system as claimed in claim 1 further comprising a trim flap-control subsystem for actuating the trim flap to pivot.

3. A system as claimed in claim 2 wherein the trim flap-control subsystem includes a position sensor for sensing when the beams are in a most leftward position and a most rightward position.

4. A system as claimed in claim 1 wherein the trim flap-control subsystem includes a controller and a trim drive;

the controller for actuating the trim drive when the beams are in the most leftward and rightward positions.

5. A system for generating oscillating motion from a dynamic water source and for delivering the motion to a power plant, the system being supported within the water source by a support subsystem, the system comprising:

a pair of spaced beams having upstream ends and downstream ends, the spaced beams being pivotally supported within the water source at the upstream ends thereof by the support subsystem;

a rod pivotally attached to at least one of the beams and for connecting to the power plant;

a foil pivotally disposed between the downstream ends of the beams, the foil having an upstream edge and a downstream edge; and a trim flap pivotally disposed at the downstream edge of the foil;

the trim flap being actuatable between a leftward position which causes the foil to pivot rightward and a rightward position which causes the foil to pivot leftward; and the foil causing the beams to pivot leftward when positioned rightward and to pivot rightward when positioned leftward, thereby causing the rod oscillate back and forth.

* * * * *